United States Patent [19]

Fukui et al.

[11] 4,412,016

[45] Oct. 25, 1983

[54] PROPYLENE POLYMER COMPOSITION

[75] Inventors: Osamu Fukui, Toyonaka; Yoshiro Umemoto, Nagoya; Tsugumi Sanmiya, Toyota; Yutaka Sano, Kishiwada; Kazuyoshi Tanaka, Sakai, all of Japan

[73] Assignees: UBE Industries, Ltd.; Toyota Jidosha Kogyo Kabushiki Kaisha, both of Osaka, Japan

[21] Appl. No.: 359,763

[22] Filed: Mar. 19, 1982

[30] Foreign Application Priority Data

Mar. 30, 1981 [JP] Japan .................................. 56-45494

[51] Int. Cl.$^3$ ........................ C08F 23/16; C08F 53/00
[52] U.S. Cl. .................................... 523/206; 524/451; 524/505; 525/88; 525/89
[58] Field of Search ................ 523/206; 524/451, 505; 525/88, 89

[56] References Cited

U.S. PATENT DOCUMENTS

| | | | |
|---|---|---|---|
| 3,478,128 | 11/1969 | Hagemeyer et al. | 525/88 |
| 3,647,922 | 3/1972 | Leugering et al. | 525/88 |
| 3,751,521 | 8/1973 | Roger | 525/88 |
| 3,887,640 | 6/1975 | Diaz et al. | 525/88 |
| 3,917,746 | 11/1975 | Aishima et al. | 525/88 |
| 3,929,932 | 12/1975 | Castagna | 525/88 |

OTHER PUBLICATIONS

Chemical Abstracts, vol. 89, No. 16, Oct. 16, 1978—Abstract 89:130513t.

*Primary Examiner*—Ronald W. Griffin
*Attorney, Agent, or Firm*—Burgess, Ryan & Wayne

[57] ABSTRACT

A shaped article having excellent rigidity, resistances to thermal deformation and to mechanical impact at a low temperature, a superior lacquer-bonding property and a satisfactory appearance is made from a propylene polymer composition comprising (A) 45 to 65% by weight of at least one crystalline ethylene-propylene block copolymer in which the content of the polymerized ethylene is in the range of from 5 to 10% by weight, in which the polypropylene component has a fraction thereof insoluble in boiling n-heptane, in an amount of 95% or more, in which a fraction thereof soluble in p-xylene at room temperature, has an intrinsic viscosity of from 3 to 4 determined in decahydronaphthalene at a temperature of 135° C. and which has a melt flow index of from 5 to 70;

(B) 25 to 40% by weight of at least one amorphous ethylene-propylene copolymer having an intrinsic viscosity of from 2.0 to 3.5 determined in decahydronaphthalene at a temperature of 135° C., and a Mooney viscosity $ML_{1+4}$ of from 40 to 100 determined at a temperature of 100° C.;

(C) 4 to 20% by weight of at least one high density polyethylene having a melt flow index of from 1 to 10; and (D) 3 to 20% by weight of talc in the form of fine particles having an average size of from 0.01 to 5 microns, the weight ratio of the amorphous ethylene-propylene copolymer (B) to the high density polyethylene (C) being in the range of from 10:1 to 5:3.

13 Claims, No Drawings

PROPYLENE POLYMER COMPOSITION

FIELD OF THE INVENTION

The present invention relates to a propylene polymer composition. More particularly, the present invention relates to a propylene polymer composition useful for producing shaped articles having an excellent lacquer-bonding property and resistance to mechanical impact and a superior appearance.

BACKGROUND OF THE INVENTION

It is known that conventional crystalline polypropylene is useful for producing various shaped articles which must exhibit excellent physical properties, such as rigidity and resistance to thermal deformation. However, it is also known that the conventional crystalline polypropylene exhibits a poor lacquer-bonding property and a poor resistance to mechanical impact applied thereto because of non-polarity and high crystallinity of the polymeric molecules thereof, and has unsatisfactory physical properties at a low temperature of, for instance, $-30°$ C. or lower. Therefore, the conventional crystalline polypropylene is not adequate as a material for producing shaped articles which simultaneously satisfy all the properties of excellent resistance to mechanical impact, lacquer-bonding property, regidity and resistance to thermal deformation.

In order to enhance the resistance to mechanical impact and to enhance the lacquer-bonding property of the crystalline polypropylene, it was attempted to blend the conventional crystalline ethylene-propylene block copolymer with an amorphous ethylene-propylene copolymer alone or a mixture of the amorphous ethylene-propylene copolymer with various types of polyethylene.

However, in this attempt, it was found that the above-mentioned modes of blends caused the resultant copolymer blends to exhibit lower rigidity and resistance to thermal deformation than those of the crystalline ethylene-propylene block copolymers.

Japanese Patent Application Laid-open No. 53-64257 (1978) discloses an approach for producing a high impact polypropylene composition having an improved resistance to mechanical impact. The composition comprises a crystalline ethylene-propylene block copolymer, amorphous ethylene-α-olefin copolymer and talc. The above-mentioned publication states that the composition exhibits a superior resistance to mechanical impact at a low temperature, regidity and lacquer-bonding property when compared to those of the conventional crystalline ethylene-propylene block copolymers, and describes certain working examples of the composition.

It was found by the inventors of the present invention that though the rigidity, resistance to thermal deformation and resistance to mechanical impact of the composition desclosed in the above-mentioned Japanese publication are satisfactory, the lacquer-bonding of the composition is unsatisfactory. Also, it was found that the surface of shaped articles made from the composition of the above-mentioned Japanese publication exhibits an unsatisfactory gloss and, sometimes undesirable flow marks are formed thereon during the shaping procedure. Therefore, the composition disclosed in the above-mentioned Japanese publication is usable only for shaped articles which are not strictly required to have an excellent lacquer-bonding property and a satisfactory luster (gloss). In other words, the composition disclosed in the Japanese publication is not adequate for producing various parts of motor vehicles, for example, bumpers, which must exhibit an excellent appearance, in addition to having excellent mechanical and physical properties.

Under these circumstances, it was strongly desired to provide a new type of polypropylene composition capable of producing shaped articles having all of the following properties: excellent Izot impact strength at a low temperature; excellent rigidity and resistance to mechanical impact, from the standpoint of rigidity; an improved lacquer-bonding property; and a superior appearance.

SUMMARY OF THE INVENTION

The object of the present invention is to provide a propylene polymer composition useful for making shaped articles having an excellent rigidity and resistance to mechanical impact together with a satisfactory resistance to thermal deformation and an enhanced lacquer-bonding property and a satisfactory appearance.

The above-mentioned object can be attained by the propylene polymer composition of the present invention, which comprises:

(A) 45 to 65% by weight of at least one crystalline ethylene-propylene block copolymer in which the content of the polymerized ethylene is in the range of from 5 to 10% by weight, in which the polypropylene component has a fraction thereof insoluble in boiling n-heptane, in an amount of 95% or more based on the weight of said polypropylene component, in which a fraction thereof, soluble in p-xylene at room temperature, has an intrinsic viscosity of from 3 to 4 determined in decahydronaphthalene at a temperature of 135° C. and which has a melt flow index of from 5 to 70;

(B) 25 to 40% by weight of at least one amorphous ethylene-propylene copolymer having an intrinsic viscosity of from 2.0 to 3.5 determined in decahydronaphthalene at a temperature of 135° C., and a Mooney viscosity $ML_{1+4}$ of from 40 to 100 determined at a temperature of 100° C.;

(C) 4 to 20% by weight of at least one high density polyethylene having a melt flow index of from 1 to 10; and (D) 3 to 20% by weight of talc in the form of fine particles having an average size of from 0.01 to 5 microns, in which composition, the ratio in weight of the amorphous ethylene-propylene copolymer (B) to the high density polyethylene (C) is in the range of from 10:1 to 5:3.

DETAILED DESCRIPTION OF THE INVENTION

The propylene polymer composition of the present invention can provide bumpers having a modulus of elasticity in bending of 8000 kg/cm² or more, an Izot impact strength of 10 kg·cm/cm or more at a temperature of $-30°$ C. and lacquer-retaining percentage of 100 in the cross cut test. That is, shaped articles made of the propylene polymer composition of the present invention have a surface thereof having a satisfactory gloss and no flow mark and exhibit a significantly enhanced resistance to mechanical impact at a low temperature, a superior lacquer-bonding property and an improved apperance while exhibiting the same level of rigidity and resistance to thermal deformation as those of other bumpers made of the conventional crystalline ethylene-propylene block copolymer alone. Accordingly, the propylene polymer composition of the present invention is useful for producing various shaped articles, especially, bumpers of motor vehicles.

The propylene polymer composition of the present invention has a melt flow index of 5.0 or more. Therefore, the molding or shaping property of the propylene polymer composition of the present invention is the same as, or rather superior to, that of the conventional propylene polymer composition consisting of a blend of a crystalline ethylene-propylene block copolymer with an amorphous ethylene-propylene copolymer and talc.

In the propylene polymer composition of the present invention, at least one crystalline ethylene-propylene block copolymer is used in an amount of from 45 to 65% by weight. That is, the crystalline block copolymer may be used in one single phase or in the form of a mixture of two or more copolymer, as long as total content of the two or more copolymers is in the range of 45 to 65% by weight.

If the content of the crystalline block copolymer is less than 45% by weight, the resultant propylene polymer composition imparts, to a shaped article made therefrom, an unsatisfactory modulus of elasticity in bending of less than 8000 kg/cm². The content of the crystalline block copolymer of more than 65% by weight causes a shaped article made from the resultant propylene polymer composition to exhibit an unsatisfactory Izot impact strength of less than 10 kg cm/cm at a temperature of $-30°$ C.

In the crystalline ethylene-propylene block copolymer used for the present invention, the content of polymerized ethylene is in the range of from 5 to 10% by weight, the polypropylene component contains a fraction thereof insoluble in boiling n-heptane, in an amount of 95% by weight or more, and fraction of the block copolymer soluble in p-xylene at room (ambient) temperature exhibits an intrinsic viscosity of from 3 to 4 determined in decahydronaphthalene at a temperature of 135° C. Also, the block copolymer exhibits a melt flow index of from 5 to 70.

The term "a fraction of the polypropylene component insoluble in boiling n-heptane" used herein, refers to a fraction in the polypropylene (matrix) component used for preparing the crystalline ethylene-propylene block copolymer, which fraction is insoluble in boiling n-heptane. In the present invention, it is necessary that the content of the boiling n-heptane-insoluble fraction in the polypropylene component be 95% by weight or more. If the content of the fraction is less than 95% by weight, the resultant propylene polymer composition causes a shaped article made from the composition to exhibit an unsatisfactory modulus of elasticity in bending of less than 8000 kg/cm².

In the crystalline block copolymer, the fraction thereof soluble in p-xylene at an ambient temperature exhibits an intrinsic viscosity of 3 to 4 determined in decahydronaphthalene at 135° C. If the intrinsic viscosity of the p-xylene soluble fraction is less than 3, the resultant propylene polymer composition causes a shaped article made from the composition to exhibit an unsatisfactory Izot impact strength of less than 10 kg·cm/cm at a temperature of $-30°$ C. Also, if the intrinsic viscosity of the p-xylene-soluble fraction is more than 4, the resultant propylene polymer composition causes a shaped article made therefrom to exhibit a poor lacquer-bonding property, that is, a lacquer-retaining percentage less than 100 in the cross cut test.

Also, the content of the polymerized ethylene in the crystalline block copolymer is in the range of from 5 to 10% by weight. If the content of ethylene is less than 5% by weight, the resultant propylene polymer composition causes a shaped article made therefrom to exhibit a poor lacquer-bonding property. Also, the content of ethylene of more than 10% by weight causes the shaped article to exhibit an unsatisfactory modulus of elasticity in bending.

The melt flow index of the crystalline block copolymer should be in the range of from 5 to 70. A melt flow index of less than 5 causes the resultant propylene polymer composition to exhibit a poor shaping property. Also, a melt flow index of more than 70 results in a poor resistance to impact of a shaped article made from the resultant propylene polymer composition.

Any other crystalline ethylene-propylene block copolymers falling outside of the scope of the crystalline ethylene-propylene block copolymer as defined above are useless for producing shaped articles having all the properties of satisfactory rigidity, resistance to thermal deformation, resistance to mechanical impact at a low temperature, lacquer-bonding property and appearance.

The amorphous ethylene-propylene copolymer usable for the propylene polymer composition of the present invention has an intrinsic viscosity of from 2.0 to 3.5 determined in decahydronaphthalene at 135° C. and a Mooney viscosity $ML_{1+4}$ (100° C.) of from 40 to 100. The term "$ML_{1+4}$(100° C.)" refers to a Mooney viscosity measured by maintaining a material to be tested at a temperature of 100° C. for 4 minutes after preheating it to 100° C. for one minute and by using a Mooney plastometer equipped with a large rotor.

When the amorphous copolymer has an intrinsic viscosity of less than 2.0, the crystalline ethylene-propylene copolymer phase, the amorphous ethylene-propylene copolymer phase and the high density polyethylene phase are separated from each other. This phase separation causes the resultant shaped article to exhibit unsatisfactory rigidity, unsatisfactory resistance to impact at a low temperature and unsatisfactory appearance. If the intrinsic viscosity is more than 3.5, the amorphous copolymer exhibits a poor compatibility with the crystalline copolymer and the high density polyethylene and the resultant shaped article exhibits a poor lacquer-bonding property.

The content of the amorphous ethylene-propylene copolymer in the propylene polymer composition of the present invention is in the range of from 25 to 40% by weight.

A content of the amorphous copolymer of less than 25% by weight causes the resultant shaped article to exhibit an unsatisfactory Izot impact strength of less than 10 kg·cm/cm at a temperature of $-30°$ C. and a poor lacquer-retaining percentage of less than 100 in the cross cut test. A content of the amorphous copolymer of more than 40% by weight results in an unsatisfactory modulus of elasticity in bending of less than 8000 kg/cm², of the resultant shaped article, and an unsatisfactory appearance.

The high density polyethylene usable for the composition of the present invention has a melt flow index of from 1 to 10 and is used in an amount of from 4 to 20% by weight in the propylene polymer composition.

When the melt flow index is less than 1, it is difficult to uniformly disperse the resultant high density polyethylene in the composition, and therefore, the resultant composition exhibits a poor shaping (molding) property and the resultant shaped article exhibits a poor appearance. When the melt flow index is more than 10, it is difficult to uniformly disperse the high density polyethylene in the composition, especially, in the amorphous ethylene-propylene copolymer phase, and the resultant shaped article exhibits an unsatisfactory rigidity and resistance to mechanical impact at a low temperature and a poor appearance.

In order to obtain a shaped article having a satisfactory rigidity and a proper resistance to mechanical impact, from the standpoint of rigidity, in addition to a satisfactory lacquer-bonding property and appearance, it is preferable that the high density polyethylene to be contained in the composition has a density of 0.95 g/cm$^3$ or more. A density of smaller than 0.95 g/cm$^3$, sometimes, may result in a shaped article having an unsatisfactory lacquer-bonding property, an unsatisfactory resistance to mechanical input at a low temperature and a poor appearance.

In the composition of the present invention, if the content of the high density polyethylene is less than 4% by weight, the resultant shaped article exhibits an unsatisfactory lacquer-bonding property and appearance. If the content of the high density polyethylene is more than 20% by weight, the resultant shaped article exhibits a decreased resistance to mechanical impact and an unsatisfactory lacquer-bonding property.

The talc to be contained in the propylene polymer composition of the present invention is in the form of fine particles having an average size of from 0.01 to 5 microns, preferably, from 0.5 to 3 microns. If the average size is less than 0.01 microns, it is difficult to uniformly disperse, by means of kneading, the talc particles in a matrix comprising the crystalline block copolymer, the amorphous copolymer and the high density polyethylene. Also, an average size of more than 5 microns causes the resultant shaped article to exhibit an unsatisfactory lacquer-retaining percentage of less than 100 in the cross cut test.

The amount of the talc in the propylene polymer composition comprising a mixture of the crystalline block copolymer with the amorphous copolymer and the high density polyethylene, is in the range of from 3 to 20% by weight. When the content of talc is less than 3% by weight, the resultant shaped article exhibits an unsatisfactory rigidity. If the content of talc is more than 20% by weight, the resultant shaped article exhibits an unsatisfactory Izot impact strength of less than 10 kg·cm/cm at a temperature of −30° C. Conventional types of talc may be used for the present invention without pretreating. Otherwise, the talc particles may be coated with at least one member selected from organic titanate type coupling agents, silane type coupling agents, fatty acids, fatty acid metal salts and fatty acid esters, to enhance the bonding property of the talc particles with the matrix consisting of the crystalline block copolymer, the amorphous copolymer and the high density polyethylene and the dispersing property of the talc particles in the matrix.

In the preparation of the propylene polymer composition of the present invention, the specific amounts of the crystalline block copolymer, the amorphous copolymer, the high density polyethylene and the talc are mixed together. In this case, it is essential that the ratio in weight of the amorphous ethylene-propylene copolymer to the high density polyethylene be in the range of from 10:1 to 5:3. When the ratio falls outside of the above-specified range, the resultant shaped article has a deteriorated lacquer-bonding property and a poor appearance.

The mixing procedure of the component polymers and talc is carried out, preferably, at an elevated temperature of, for example, 170° to 200° C. usually by using a mixer or kneader, for example, a heat roll mixer, a monoaxial extruder, a biaxial extruder, Bumbury's mixer or FCM, preferably, Bumbury's mixer.

The composition of the present invention may contain a small amount of one or more additives, for example, an anti-oxidant, an ultra violet ray-absorbing agent, a flame retardant, a pigment, an agent for enhancing lacquer-bonding property, a plasticizer, a lubricant and an anti-static agent.

The anti-oxidant may consist of at least one member selected from the group consisting of 2,6-di-tert-butylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3.5-di-tert-butylanilino)-2,4-bis-octyl-thio-1,3,5-triazine, n-octadecyl-3-(4'-hydroxy-3'5'-di-tert-butylphenyl) propionate, 2,6-di-tert-butyl-4-methylphenol(BHT), tris-(2-methyl-4-hydroxy-5-tert-butylphenyl)butane, tetrakis-[methylene 3-(3',5'-di-tert-butyl-4'-hydroxyphenyl) propionate] methane, 1,3,5-trimethyl-2,4,6-tris(3.5-di-tert-butyl-4-hydroxylbenzyl) benzene, and dilaurylthiodipropionate.

The ultra violet ray-absorbing agent may consist of at least one member selected from the group consisting of 2-hydroxy-4-n-octoxybenzophenone, 2-hydroxy-4-octadecyloxybenzophenone, 4-dodecyloxy-2-hydroxybenzophenone, 2-hydroxy-4-n-octoxybenzophenone, 2-(2'-hydroxy-3'-tert-butyl-5'-methylphenyl)-5-chlorobenzotriazole, 2-(2'-hydroxy-3'5'-di-tert-butylphenyl)-5-chlorobenzotriazole, nickel-bis-(orthoethyl-3.5-di-tert-butyl-4-hydroxybenzyl) phosphonate and bis(2,6-dimethyl-4-piperidyl) sebacate.

The flame retardant may consist of at least one member selected from the group consisting of antimony trioxide, tricresyl phosphate, halogenated alkyltriazines, decabromodiphenyl ether and chlorinated polyethylenes.

The pigment includes carbon black and titanium dioxide. Magnesium benzoate is effective as an agent for enhancing the lacquer-bonding property of the propylene polymer composition.

The plasticizer may consist of a process oil, and the lubricant may consist of one or more fatty acid metal salts.

Also, the antistatic agent may be a polyoxyethylene alkylether.

The shaped articles, for example, bumpers can be produced by a conventional shaping process, for example, an injection molding process, from the propylene polymer composition of the present invention. The resultant shaped articles exhibit an excellence in all the following properties: rigidity, resistance to impact at a low temperature, resistance to thermal deformation, lacquer-bonding property and appearance. The degree of the resistance to mechanical impact of the shaped article is proper in view of the rigidity thereof.

The specific examples presented below will serve to more fully elaborate how the present invention is practiced. However, it should be understood that these examples are only illustrative and in no way limit the scope of the present invention.

In the examples, the melt flow index was determined in accordance with ASTM D 1238, the modulus of elasticity in bending was determined in accordance with ASTM D 790, the Izot impact strength was determined in accordance with ASTM D 256, and the temperature of thermal deformation under a load of 4.6 kg/cm$^2$ was determined in accordance with ASTM-D 648.

EXAMPLE 1

A propylene polymer composition was prepared by mixing 20 parts by weight of a crystalline ethylene-propylene block copolymer, which will be represented by EP copolymer A hereinafter, in which the content of the polymerized ethylene was 8% by weight, in which the content of a fraction of the polypropylene component, being insoluble in boiling n-heptane is 97% by weight or more, in which the intrinsic viscosity of a fraction of the EP copolymer A, being soluble in p-xylene at the ambient temperature, was 3.4 determined in decahydronaphthalene at 135° C. and which has a melt flow index of 30; 38 parts by weight of another crystalline ethylene-propylene block copolymer, which will be represented by EP copolymer B hereinafter, in which the content of the polymerized ethylene was 9% by weight, in which the content of a fraction of the polypropylene component, being insoluble in boiling n-heptane is 97% by weight or more, in which the intrinsic viscosity of a fraction of the EP copolymer B, being soluble in p-xylene at the ambient temperature, was 3.6 determined in decahydronaphthalene at 135° C. and which has a melt flow index of 15; 27 parts by weight of an amorphous ethylene-propylene copolymer, which will be represented by EPR hereinafter, which had an intrinsic viscosity of 2.3 determined in decahydronaphthalene at 135° C. and a Mooney viscosity $ML_{1+4}$ (100° C.) of about 70 and which contained about 75% by weight of polymerized ethylene; 5 parts by weight of a high density polyethylene which will be referred to as HDPE hereinafter, having a melt flow index of 5 and a density of 0.95 g/cm$^3$; 0.05 parts by weight of BHT; 0.3 parts by weight of tetrakis-[methylene-3-(3',5'-di-tert-butyl-4'-hydroxyphenyl)propionate] methane; 0.35 parts by weight of bis-(2,6-dimethyl-4-piperidyl) sebacate; 0.3 parts by weight of nickel-bis-(orthoethyl-3,5-di-tert-butyl-4-hydroxybenzyl) phosphonate; and 10 parts by weight of talc in the form of fine particles having an average size of 2 microns, by using a Bumbury's mixer at a temperature of 180° C. for 12 minutes.

The resultant mixture was pelletized into pellets having a thickness of 3 mm and a length of 4 mm.

100 parts by weight of the pellets were mixed with 0.6 parts by weight of carbon black and the resultant mixture was melted at a temperature of from 220° to 240° C. in a monoaxial extruder, extruded through extruding holes and the extruded mixture was pelletized into granules having a diameter of 2 mm and a length of 4 mm. The granules were converted into specimens to determine the modulus of elasticity in bending, the Izot impact strength, and the lacquer-retaining percentage by the cross cut method.

The cross cut test was carried out in such a manner that a specimen was coated with an under coating layer formed from a two liquid type acrylic-chlorinated polypropylene coating material and having a thickness of 10 microns and, then, coated with an over coating layer having a thickness of 20 microns and formed from a two-liquid type acrylic-urethane coating material. The under and over coating layers were dried at a temperature of 80° C. for 30 minutes and, then, allowed to stand at an ambient temperature for 40 hours. A lacquer coating layer was formed on the surface of the specimen. The lacquer coating layer was cut by using a multi-cross cutter to form 100 squares having a length of 1 mm and a width of 1 mm. An adhesive sheet was adhered onto the surface of the cross-cut lacquer layer and rapidly pulled up at an angle of 45 degrees to the lacquer layer surface. These procedures were repeated twice. The number of the squares retained on the specimen was counted. The degree of the lacquer-bonding property of the specimen was represented by a percentage of the retained squares to 100 squares.

Also, the melt flow index of the granulated mixture of the propylene polymer composition with carbon black was measured.

The results of the measurements are indicated in Table 1.

EXAMPLES 2 THROUGH 5

In each of the Examples 2 through 5, the same procedures as those described in Example 1 were carried out, except that the EP copolymer A, the EP copolymer B, the EPR, the HDPE, and the talc were used in amounts as indicated in Table 1.

The results are indicated in Table 1.

TABLE 1

| Item | | Example No. 1 | 2 | 3 | 4 | 5 |
|---|---|---|---|---|---|---|
| Composition | EP copolymer A | 20 | 7 | 15 | 10 | 58 |
| (part by weight) | EP copolymer B | 38 | 38 | 33 | 33 | 0 |
| | EPR | 27 | 40 | 27 | 27 | 27 |
| | HDPE | 5 | 5 | 15 | 5 | 5 |
| | Talc | 10 | 10 | 10 | 20 | 10 |
| Melt flow index (g/10 min.) | | 6.4 | 5.0 | 6.2 | 6.2 | 13.0 |
| Modulus of elasticity in bending (kg/cm$^2$) | | 11400 | 8000 | 11500 | 13400 | 11500 |
| Izot impact strength | 23° C. | >60 | >60 | >60 | >60 | >60 |
| (kg cm/cm)* | −30° C. | 11.5 | 55.0 | 15.0 | 10.5 | 10.0 |
| Temperature (°C.) of thermal deformation under load of 4.6 kg/cm$^2$ | | 96 | 93 | 92 | 101 | 95 |
| Lacquer-bonding property (percent of retaining lacquer) | | 100 | 100 | 100 | 100 | 100 |
| Appearance | | Satisfactory | Satisfactory | Satisfactory | Satisfactory | Satisfactory |
| General evaluation | | Satis- | Satis- | Satis- | Satis- | Satis- |

TABLE 1-continued

| Item | Example No. | | | | |
|---|---|---|---|---|---|
| | 1 | 2 | 3 | 4 | 5 |
| | factory | factory | factory | factory | factory |

Note:
* = The specimen used had a notch.

COMPARATIVE EXAMPLES 1 THROUGH 6

In each of the Comparative Examples 1 through 3, procedures identical to those described in Example 1 were carried out, except that the EP copolymer A, the EP copolymer B, the EPR, the HDPE, and the talc were used in amounts as indicated in Table 2.

In Comparison Example 4, the same procedures as those described in Example 1 were carried out, except that the EP copolymers A and B were replaced by a crystalline propylene homopolymer, which will be represented by PP homopolymer hereinafter, which contained 97% by weight or more of a fraction thereof insoluble in boiling n-heptane and had a melt flow index of 30 and in which a fraction thereof soluble in p-xylene at an ambient temperature had an intrinsic viscosity of 3.6 determined in decahydronaphthalene at 135° C., and the PP homopolymer, the EPR, the HDPE and the talc were used in amounts as indicated in Table 2.

In Comparison Example 5, the same procedures as those described in Example 1 were carried out, except that the HDPE was replaced by a low density polyethylene having a density of 0.92 g/cm$^3$ and the component polymers and talc were used in the amounts indicated in Table 2.

In Comparison Example 6, the same procedures as those described in Example 1 were carried out, except that the particles of talc used had an average size of 7 microns, and the component polymers and talc were used in the amounts indicated in Table 2.

The results are indicated in Table 2.

based on the weight of said polypropylene component, in which a fraction thereof soluble in p-xylene at room temperature, has an intrinsic viscosity of from 3 to 4 determined in decahydronaphthalene at a temperature of 135° C. and which has a melt flow index of from 5 to 70;
(B) 25 to 40% by weight of at least one amorphous ethylene-propylene copolymer having an intrinsic viscosity of from 2.0 to 3.5 determined in decahydronaphthalene at a temperature of 135° C., and a Mooney viscosity ML$_{1+4}$ of from 40 to 100 determined at a temperature of 100° C.;
(C) 4 to 20% by weight of at least one high density polyethylene having a melt flow index of from 1 to 10; and
(D) 3 to 20% by weight of talc in the form of fine particles having an average size of from 0.01 to 5 microns, in which composition, the ratio in weight of said amorphous ethylene-propylene copolymer (B) to said high density polyethylene (C) is in the range of from 10:1 to 5:3.

2. The propylene polymer composition as claimed in claim 1, wherein said high density polyethylene has a density of 0.95 g/cm$^3$ or more.

3. The propylene polymer composition as claimed in claim 1, wherein said talc has an average size of from 0.5 to 3 microns.

4. The propylene polymer composition as claimed in claim 1, wherein the talc particles are coated with at least one member selected from organic titanate coupling agents, silane coupling agents, fatty acids, fatty

TABLE 2

| Item | | Comparative Example No. | | | | | |
|---|---|---|---|---|---|---|---|
| | | 1 | 2 | 3 | 4 | 5 | 6 |
| Composition | EP copolymer A | 20 | 22 | 20 | — | 20 | 20 |
| (part by weight) | EP copolymer B | 45 | 38 | 56 | — | 38 | 38 |
| | PP homopolymer | — | — | — | 58 | — | — |
| | EPR | 20 | 27 | 27 | 27 | 27 | 27 |
| | HDPE | 5 | 3 | 5 | 5 | 5(*)$_2$ | 5 |
| | Talc | 10 | 10 | 2 | 10 | 10 | 10(*)$_3$ |
| Melt flow index (g/10 min.) | | 8.7 | 6.4 | 8.6 | 12.9 | 6.3 | 6.4 |
| Modulus of elasticity in bending (kg/cm$^2$) | | 12800 | 11500 | 9600 | 12900 | 11200 | 11000 |
| Izot impact strength | 23° C. | >60 | >60 | >60 | 17 | >60 | 40 |
| (kg cm/cm)(*)$_1$ | −30° C. | 7.2 | 11.4 | 10.8 | 4.0 | 11.5 | 6.7 |
| Lacquer-bonding property (percent of retaining lacquer) | | 85 | 100 | 90 | 65 | 100 | 100 |
| Appeaarance | | Satisfactory | Unsatisfactory | Satisfactory | Satisfactory | Unsatisfactory | Unsatisfactory in gloss |
| General evaluation | | Unsatisfactory | Unsatisfactory | Unsatisfactory | Unsatisfactory | Unsatisfactory | Unsatisfactory |

Note:
(*)$_1$The specimen used had a notch.
(*)$_2$density = 0.92 g/cm$^2$
(*)$_3$average size = 7 microns

We claim:
1. A propylene polymer composition comprising
(A) 45 to 65% by weight of at least one crystalline ethylene-propylene block copolymer in which the content of the polymerized ethylene is in the range of from 5 to 10% by weight, in which the polypropylene component has a fraction thereof insoluble in boiling n-heptane in an amount of 95% or more acid metal salts and fatty acid esters.

5. The propylene polymer composition as claimed in claim 1, further comprising at least one additive consisting of at least one member selected from anti-oxidants, ultraviolet ray absorbing agents, flame retardants, pigments, lacquer-bonding enhancers, plasticizers, lubricants and anti-static agents.

6. The propylene polymer composition as claimed in claim 5 wherein said anti-oxidant comprises at least one member selected from the group consisting of 2,6-di-tert-butylphenol, 2,6-di-tert-butyl-4-ethylphenol, 2,6-di-tert-butyl-4-n-butylphenol, 2,6-di-tert-butyl-α-dimethylamino-p-cresol, 6-(4-hydroxy-3,5-di-tert-butylanilino)-2,4-bis-octyl-thio-1,3,5-triazine, n-octadecyl-3-(4'-hydroxy-3,'5',-di-tert-butylphenyl) propionate, 2,6-di-tert-butyl-4-methylphenol (BHT), tris-(2-methyl-4-hydroxy-5-tert-butylphenyl) butane, tetrakis-[methylene 3-(3',5'-di-tert-butyl-4'-hydroxyphenyl) propionate] methane, 1,3,5 -trimethyl-2,4,6-tris (3,5-di-tert-butyl-4-hydroxybenzyl) benzene, and dilaurylthiodipropionate.

7. The propylene polymer composition as claimed in claim 5 wherein said ultraviolet ray absorbing agent comprises at least one member selected from the group consisting of 2-hydroxy-4-n-octoxybenzophenone, 2-hydroxy-4-octadecyloxy-benzophenone, 4-dodecyloxy-2-hydroxybenzophenone, 2-hydroxy-4-n-octoxybenzophenone, 2-(2'-hydroxy-3'-tert-butyl-5'-methylphenyl)-5-chlorobenzotriazole, 2-(2'-hydroxy-3'5'-di-tert-butylphenyl)-5-chloro-benzotriazole, nickel-bis-(orthoethyl-3,5-di-tert-butyl-4-hydroxybenzyl) phosphonate and bis (2,6-dimethyl-4-piperidyl) sebacate.

8. The propylene polymer composition as claimed in claim 5, wherein said flame retardant comprises at least one member selected from the group consisting of antimony trioxide, tricresyl phosphate, halogenated alkyltriazines, decabromodiphenyl ether and chlorinated polyethylenes.

9. The propylene polymer composition as claimed in claim 5, wherein said pigment is selected from the group consisting of carbon black and titanium dioxide.

10. The propylene polymer composition as claimed in claim 5, wherein said lacquer-bonding enhancer comprises magnesium benzoate.

11. The propylene polymer composition as claimed in claim 5, wherein said plasticizer comprises a process oil.

12. The propylene polymer composition as claimed in claim 5, wherein said lubricant comprises a fatty acid metal salt.

13. The propylene polymer composition as claimed in claim 5, wherein said antistatic agent comprises a polyoxyethylene alkylether.

* * * * *